(12) United States Patent
    Smith

(10) Patent No.: US 9,095,959 B1
(45) Date of Patent: Aug. 4, 2015

(54) ADJUSTABLE SOLDERING HOLD DOWN

(76) Inventor: David Lee Smith, Westfield, IN (US)

( * ) Notice: Subject to any disclaimer, the term of this patent is extended or adjusted under 35 U.S.C. 154(b) by 0 days.

(21) Appl. No.: 13/573,130

(22) Filed: Aug. 24, 2012

Related U.S. Application Data

(60) Provisional application No. 61/527,705, filed on Aug. 26, 2011.

(51) Int. Cl.
| | |
|---|---|
| B25B 5/06 | (2006.01) |
| B43L 5/02 | (2006.01) |
| H01L 21/687 | (2006.01) |
| B25B 1/02 | (2006.01) |
| B23Q 3/00 | (2006.01) |
| E04G 1/36 | (2006.01) |
| E04G 3/00 | (2006.01) |
| B25B 11/00 | (2006.01) |
| B25B 1/24 | (2006.01) |
| B25B 5/02 | (2006.01) |

(52) U.S. Cl.
    CPC . *B25B 11/00* (2013.01); *B25B 1/24* (2013.01); *B25B 1/2421* (2013.01); *B25B 1/2447* (2013.01); *B25B 5/02* (2013.01)

(58) Field of Classification Search
    USPC ..................................................... 269/254 R
    See application file for complete search history.

(56) References Cited

U.S. PATENT DOCUMENTS

| | | | | | |
|---|---|---|---|---|---|
| 245,344 | A | * | 8/1881 | Bray .............................. | 182/165 |
| 1,415,144 | A | * | 5/1922 | Bublitz ......................... | 144/259 |
| 1,612,390 | A | * | 12/1926 | Maynard ....................... | 269/295 |
| 1,788,546 | A | * | 1/1931 | Schmieder ...................... | 269/37 |
| 2,366,350 | A | * | 1/1945 | Ostling .......................... | 269/249 |
| 3,520,506 | A | * | 7/1970 | Zahuranec et al. ........... | 248/188 |
| 3,843,110 | A | * | 10/1974 | Smith ......................... | 269/254 R |
| 4,024,851 | A | * | 5/1977 | Boda ............................... | 126/30 |
| 4,062,423 | A | * | 12/1977 | Armbruster ................... | 182/129 |
| 4,159,821 | A | * | 7/1979 | Hickman ...................... | 269/139 |
| 4,203,242 | A | * | 5/1980 | Griffin ........................... | 40/610 |
| 4,248,411 | A | * | 2/1981 | Wagster et al. ................. | 269/67 |
| 4,570,915 | A | * | 2/1986 | O'Hern .......................... | 269/295 |
| 4,993,635 | A | * | 2/1991 | Dupre .......................... | 239/14.2 |
| 5,043,750 | A | * | 8/1991 | Yamaguchi ................... | 396/428 |
| 6,044,929 | A | * | 4/2000 | Wishner ....................... | 182/200 |
| 6,389,988 | B1 | * | 5/2002 | Frattini ...................... | 108/50.02 |
| 6,401,865 | B1 | * | 6/2002 | Elwick ........................ | 182/182.1 |
| 6,732,724 | B1 | * | 5/2004 | Paulson et al. .................... | 124/6 |
| 7,430,968 | B2 | * | 10/2008 | Clark ............................ | 108/115 |
| 7,735,499 | B1 | * | 6/2010 | Pennise ........................... | 135/67 |

(Continued)

FOREIGN PATENT DOCUMENTS

| | | | |
|---|---|---|---|
| DE | 4108455 C2 | * 12/1999 | |
| FR | 2593422 A1 | * 7/1987 | ............... B25B 5/10 |

*Primary Examiner* — Lee D Wilson
*Assistant Examiner* — Alvin Grant
(74) *Attorney, Agent, or Firm* — Joseph H. Smith

(57) ABSTRACT

A tool for holding a work piece being soldered, welded or glued, the tool being made up of a weight with three or more legs that protrude from said weight, each leg having an end such that the ends of three of the legs define a triangle. Typically, the legs extend completely through the weight. The legs are preferably rotatable about their longitudinal axes, and are longitudinally adjustable along their length with respect to the weight. One or more of the legs may be bent at the end. Generally, the legs are held in place by the effect of gravity and a precision fit of the legs within the weight. Each of the legs is moveable along its longitudinal axis through the weight, and one of the legs is bent at an end to an angle ranging from greater than 0 to less than 180 degrees.

4 Claims, 1 Drawing Sheet

(56) References Cited

U.S. PATENT DOCUMENTS

| | | | |
|---|---|---|---|
| 7,824,457 B2 * | 11/2010 | Witter | 55/337 |
| 7,909,074 B2 * | 3/2011 | Yu | 144/286.5 |
| 7,934,687 B2 * | 5/2011 | Crook et al. | 248/168 |
| 7,959,116 B2 * | 6/2011 | Carnevali | 248/177.1 |
| 8,302,796 B1 * | 11/2012 | Johnson | 220/3.9 |
| 2001/0028187 A1 * | 10/2001 | Kielhorn | 297/310 |
| 2003/0205179 A1 * | 11/2003 | Ilijas | 108/157.16 |
| 2003/0232320 A1 * | 12/2003 | Lee | 434/403 |
| 2006/0143820 A1 * | 7/2006 | Matthews | 4/611 |
| 2006/0143821 A1 * | 7/2006 | Matthews | 4/611 |
| 2007/0281579 A1 * | 12/2007 | Sambenedetto | 446/124 |
| 2008/0061019 A1 * | 3/2008 | Lin et al. | 211/187 |

* cited by examiner

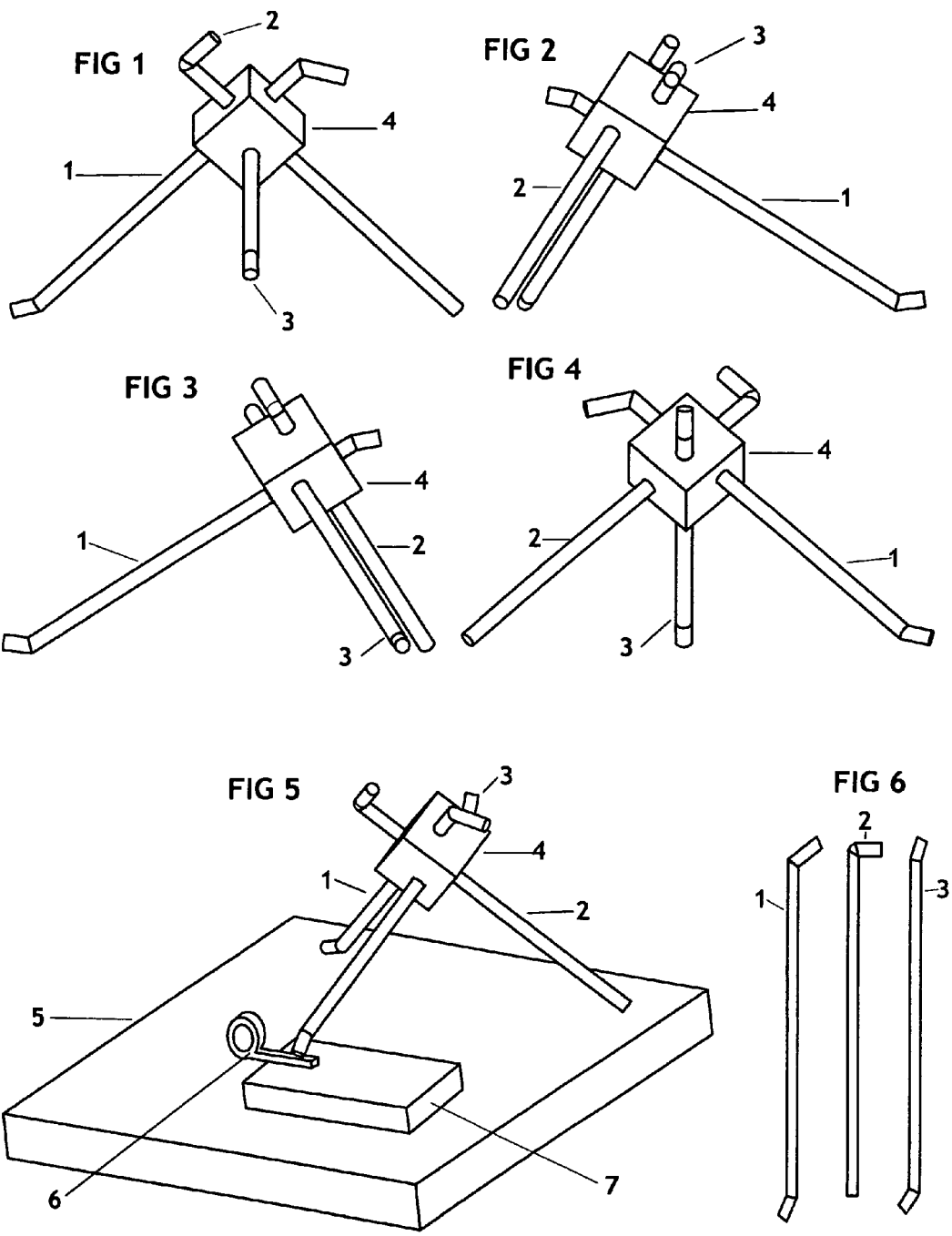

ADJUSTABLE SOLDERING HOLD DOWN

PRIORITY CLAIM

This invention claims priority from U.S. Provisional Patent Application No. 61/527,705, entitled Adjustable Soldering Hold Down, by inventor David Lee Smith, a US citizen residing in Westfield, Ind., filed Aug. 26, 2011.

BACKGROUND OF THE INVENTION

The present invention is in the technical field of soldering, welding and gluing.

More particularly, the present invention is in the technical field of material positioning devices, and more particularly in the technical field of jewelry tools.

In previous art, most such tools rely on some kind of clamping device that has opposed jaws and articulating arms. These jaws are in direct contact with the materials to be joined in a manner that obstructs the even application of heat when soldering and welding or interferes with the application of the glues that hold the components being worked upon. These devices often become attached to the work piece making it defective. These devices are also large in bulk or wide in footprint relative to the work piece, which makes them difficult to use on irregularly shaped components.

PRIOR ART

| | | | |
|---|---|---|---|
| 4,535,979 | AUG. 20, 1985 | ALIGNMENT TOOL FOR PIECE WORK | JAMES PAARMANN |
| 1,005,010 | OCT. 3, 1911 | SOLDERING APPARATUS | WILLIE W. EARNSWORTH |
| D168402 | DEC. 16, 1952 | FLEXIBLE CLAMP FOR JEWELRY PARTS | WILLIAM H. HATCH |
| 307,178 | OCT. 28, 1884 | C. P. ADJUSTABLE SOLDERING-FORCEPS | C. P. CARTER |
| 234,560 | NOV. 16, 1880 | TOOL FOR JWELERS USE | L. G. GRADY |

SUMMARY OF THE INVENTION

The present invention is used to hold components to be joined in a fixed position while being soldered, welded or glued. It relies on the force of gravity to apply pressure upon the components being joined. It uses three legs, two of which support a weight that is suspended above the centerline of the components being joined. The weight is movable on the two legs to allow the third leg to apply the pressure at an optimum angle for maximum effectiveness. The positioning of the legs allows for the device to be in closer or distant proximity to the components being joined and to be supported on irregular surfaces.

BRIEF DESCRIPTION OF THE DRAWINGS

FIG. 1 is a front view of the present invention;
FIG. 2 is a left side view of the present invention;
FIG. 3 is a right side view of the present invention
FIG. 4 is a back view of the present invention.
FIG. 5 is a perspective view of the present invention as it holds in place two pieces that are to be joined, which are positioned upon a soldering surface.
FIG. 6 provides a view of legs 1, 2, and 3.

DETAILED DESCRIPTION OF THE INVENTION

Referring now to an embodiment of the invention in more detail in FIG. 1, there are shown three cylindrical legs 1, 2 and 3 that pass through a weight 4. The cylindrical legs 1, 2 and 3 support the weight 4 in an elevated position. In this embodiment, the weight 4 is a cube of a solid mass of lead with three holes that are perpendicular to each of its sides and pass completely through it. FIG. 1 also shows that leg 2 is bent at a 90 degree angle on the upper end and is not bent on the lower end. Generally, the weight 4 is drilled with holes of sufficient diameter that each of the legs separately can move back and forth through the weight relatively easily, but it is preferred that the clearance is small enough to provide some friction with the legs, i.e. a precision fit. Also, the legs are rotatable in the holes around their longitudinal axes.

In more detail, in the right side view FIG. 2, in the preferred mode, it is shown that two of the legs 2 and 3 lie on parallel planes that do not intersect, so that the legs do not interfere as they pass through the weight. The legs 2 and 3 need not lie in parallel planes, but such arrangement provides for easier manufacture. FIG. 2 also illustrates that leg 1 is at 90 degrees to legs 2 and 3 and that leg 3 has an angle bent into it on both the top and bottom end.

In further detail in the left side view FIG. 3, it is shown that legs 1, 2 and 3 extend through the weight and protrude out the sides of the weight 4.

In further detail in the rear view FIG. 4, it is shown that legs 1 and 2 are perpendicular to each other. It also shows that the weight 4 cannot slide down in a downward motion because of that perpendicularity.

Although the perpendicularity of the legs is preferred for ease of manufacturing, these relative angles need not be perpendicular, as long as they sufficiently not in the same plane, so that the weigh 4 does not slide In further detail in the isometric view FIG. 5, the device is shown performing its function of holding a bail 6 in position on the back of an elongated cubic shaped jewelry pendant 7 on top of a soldering surface 8 in preparation for soldering. Conceptually, the lower ends of legs 1, 2 and 3 form a triangle and the tool can sit on uneven surfaces, and each of the legs carries some portion of the weight of weight 4. To ensure that each leg has some portion of the weight, the legs are adjusted so that the vertical projection of the center of mass of weight 4 lies inside the triangle defined by the ends of the legs, typically with a substantial portion of the weight being on the leg holding the work piece.

In more detail in the front view FIG. 6 of the preferred embodiment, the cylindrical legs 1,2 & 3 are shown with their respective bends in the ends of each. Leg 1 has a 45 degree bend to the right at the top and a 22.5 degree bend to the left at the bottom. Leg 2 has no bend at the bottom and a 90 degree bend right at the top, so that leg 2 can be removed from the weight. Removing leg 2 from the weight permits the tool to be able to be stored in a smaller space. Leg 3 has a 15 degree bend to the right at the top and a 30 degree bend to the left at the bottom. In FIG. 6, the bends in all three legs 1, 2 and 3 are shown in the same plane.

In further detail, still referring to the embodiment in FIGS. 1, 2, 3 and 4, the weight 4 is of sufficient size and mass to put a substantial pressure onto the parts being held in place by one of the legs. The legs 1, 2 and 3 can be extended away from or toward the weight 4 at different lengths and rotated at different angles to accommodate the different shapes and angles of the materials that they will come in contact with. The length of the legs 1, 2 and 3 can be as short as 2 times the width of the weight 4 and still hold it elevated above the work being held down. The length of legs 1, 2, and 3 can be as long as practically possible to suspend the weight above the centerline of the work piece being held. The bends on legs 1, 2 and 3 are different from each other to allow their ends to make contact with the different shaped components that they may be holding.

In further detail referring to FIG. 5 in the preferred mode, the weight 4 is one inch wide by one inch high by one inch deep. The holes where the legs 1, 2 and 3 go through the weight 4 are 0.1880 inch in diameter and they pass completely through it. The legs 1, 2 and 3 are 0.1875 inch in diameter and approximately five inches long to eight inches long and each has a one half inch bend of various angles in each end. The precision fit of the legs 1, 2 and 3 in the weight 4 and the force of gravity exerted upon their lateral surfaces prevents the weight from collapsing and negates the need for any device to lock them into a fixed position. The bends at the ends of the legs 1, 2 and 3 are not limited to the 15, 22.5, 30, 45, 60 and 90 but can be at formed at any angle from 0 to 180 degrees, and can be chosen to accommodate the holding down of the work piece.

In further detail, in the preferred mode, the legs 1, 2 and 3 are made of cylindrical steel rod of sufficient strength to support the mass of the weight 4 without bending. More generally, however, the legs 1, 2 and 3 can be made of any material that is sufficient to suspend the weight 4 without bending or melting while the parts being held are joined or soldered. In the preferred mode, the weight 4 is made of lead. The weight 4 could also be made of any material or combination of materials that has sufficient mass to produce enough downward force to hold the parts in place while being soldered or joined.

The advantages of the present invention include, without limitation, enabling the person soldering the ability to perform the joining of two materials without being required to hold them in position with a clamping device that has jaws that may become soldered to the object being joined. It also enables the user to achieve different working angles unobstructed by the cumbersome paraphernalia currently used to position materials to be worked upon. The minimal surface area touching the part to be soldered allows for a more even distribution of heat while soldering. This invention's variable configuration allows it to be placed upon non-level surfaces and still perform its function.

In its broad concept, the present invention is a tool with three legs and a suspended weight that is used to hold materials in place while soldering them or joining them to each other.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. In particular, the weight 4 need not be a cube, but merely a mass having most any closed surface, and made of a material of sufficient strength to support the legs 1, 2, and 3. For example, the weight 4 could be a more general polyhedron, a sphere, an ellipsoid, or a cone, or a cylinder, preferably some shape that is easy to manufacture and handle. Also, the angles between legs 1, 2 and 3, need not be perpendicular, but merely of sufficient angle to support the weight without the tool collapsing. Also, one need not use just three legs, more legs can be used as well.

What is claimed is:

1. A tool for holding a work piece being soldered, welded or glued, said tool comprising:
   a weight with exactly three one-piece legs that protrude from said weight, each leg having a longitudinal axis and an end such that the ends of said legs define a triangle, wherein said three legs extend through the weight and also, protrude from opposite sides of the weight, wherein none of said longitudinal axes is parallel with any other of said longitudinal axes, wherein each of said legs is moveable along said longitudinal axis through the weight, and wherein at least one of said legs is bent at an end to an angle ranging from greater than 0 to less than 180 degrees.

2. The tool of claim 1, wherein at least one of said legs is rotatable about said longitudinal axis.

3. The tool of claim 1, wherein said legs are held in place by the effect of gravity and a precision fit of the legs within the weight.

4. The tool in claim 1, wherein one leg is removable from the weight so that the entire tool can be stored in less space.

* * * * *